US00H002259H

(19) United States
(12) Statutory Invention Registration
Boswell et al.

(10) Reg. No.: US H2259 H
(43) Published: Jul. 5, 2011

(54) YIELD ENHANCING DEVICE AND METHOD OF USE

(75) Inventors: Christopher Boswell, Alexandria, VA (US); Gerardo Pangilinan, Alexandria, VA (US)

(73) Assignee: The United States of America as represented by the Secretary of the Navy, Washington, DC (US)

(21) Appl. No.: 12/315,487

(22) Filed: Nov. 26, 2008

(51) Int. Cl.
*F42B 1/00* (2006.01)

(52) U.S. Cl. ..... 102/305
(58) Field of Classification Search ..... 86/50; 102/335, 305
See application file for complete search history.

(56) References Cited

U.S. PATENT DOCUMENTS

| | | | | |
|---|---|---|---|---|
| 3,661,086 | A | | 5/1972 | Thomanek et al. |
| 3,747,526 | A | * | 7/1973 | Jany ..... 102/429 |
| 4,493,260 | A | | 1/1985 | Foster |
| 5,166,469 | A | | 11/1992 | Kerdraon et al. |
| 5,394,804 | A | | 3/1995 | Cauchetier |
| 5,561,261 | A | | 10/1996 | Lindstadt et al. |
| 5,565,644 | A | | 10/1996 | Chawla |
| 5,565,647 | A | | 10/1996 | Kerdraon et al. |
| 5,753,850 | A | | 5/1998 | Chawla et al. |
| 6,923,122 | B2 | | 8/2005 | Hennings et al. |
| 6,969,434 | B1 | * | 11/2005 | Chan et al. ..... 149/19.5 |
| 7,331,268 | B1 | * | 2/2008 | Pangilinan et al. ..... 86/50 |
| 2004/0211335 | A1 | | 10/2004 | Helander |
| 2006/0124021 | A1 | | 6/2006 | Urwin |

* cited by examiner

*Primary Examiner*—Dan Pihulic
(74) *Attorney, Agent, or Firm*—Fredric J. Zimmerman

(57) ABSTRACT

A method and apparatus for enhancing explosive yield is provided. The apparatus generally includes an energetic charge operatively associated with a guide. The guide is operatively associated with a reactive material. According to an aspect of the method, the energetic charge is activated to produce a shockwave to impact a reactive material. The shockwave is focused by the guide to impact the reactive material. Impacting the reactive material releases energy in the reactive material to enhance the yield of the energetic charge.

21 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

YIELD ENHANCING DEVICE AND METHOD OF USE

GOVERNMENT LICENSING CLAUSE

The invention described herein may be manufactured and used by or for the Government of the United States of America for governmental purposes without the payment of any royalties thereon or therefore.

FIELD OF THE INVENTION

The present invention relates generally to ordnance, and more specifically to a device and method for increasing the yield of an explosive.

BACKGROUND OF THE INVENTION

Explosive ordnance by its nature presents dangers in storage and handling. Thus, while ordnance of higher yield may be necessary depending on the mission, such higher yielding ordnance increases the hazards associated with such ordnance. It is desired to increase the yield of ordnance, or other explosive devices, without increasing, and maybe even by decreasing the hazard associated therewith.

SUMMARY OF THE INVENTION

The present invention may comprise one or more of the following features and combinations thereof.

In one illustrative embodiment, a yield enhancing device generally comprising an energetic charge, a guide, and a reactive material is provided. The energetic charge and the guide may be operatively connected, associated or joined to each other. The guide and the reactive material may be adjacent to each other. The guide and the reactive material may also be operatively connected to, joined, or associated with each other.

Also presented is an illustrative method of enhancing yield including the steps of: producing a shock wave, imparting the shockwave at an effective velocity and temperature on a fluid to create and drive a plasma, and impacting the plasma on a reactive material to release energy stored in the reactive material. The shockwave may be produced by detonating an energetic charge.

Also presented is an illustrative method of manufacturing a yield enhancing device including the steps of: positioning an energetic charge in operative association with a guide element; and positioning the guide in operative association with a reactive material. The reactive material comprises a generally inert but energetically reactive material. The reactive material may be chosen from the list consisting of polytetrafluoroethylene, polyethylene, rubber, and a metal.

These and other objects of the present invention will become more apparent from the following description of the illustrative embodiments.

DESCRIPTION OF THE ILLUSTRATIVE EMBODIMENTS

Figure 1:
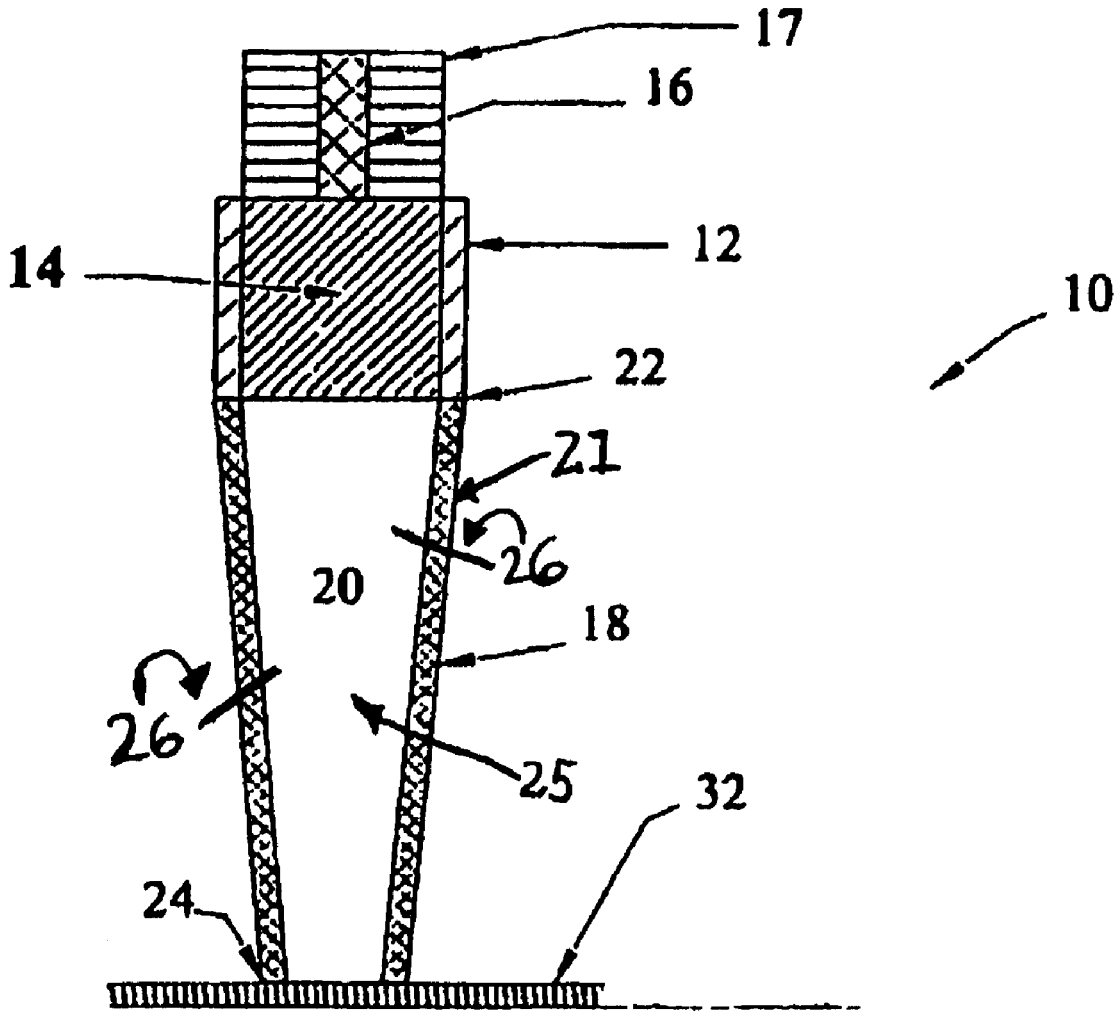
FIG. 1 is a side, cross-sectional view of an illustrative yield enhancing device.

For the purposes of promoting an understanding of the principles of the invention, reference will now be made to a number of illustrative embodiments illustrated in the drawings and specific language will be used to describe the same. In the illustrative drawings, like reference characters designate like or corresponding parts throughout the drawings. For similar but not identical parts, an alphabetic suffice (e.g., "A") is used. It should be noted, however, that the invention in its broader aspects is not limited to the specific details, representative devices and methods, and illustrative examples shown and described in this section in connection with the illustrative embodiments and methods. It is to be noted that, as used in the specification and the appended claims, the singular forms "a," "an," and "the" include plural referents unless the context clearly dictates otherwise.

Referring now more particularly to the drawings there is shown an illustrative yield enhancing device 10. The illustrative device 10 generally comprises an energetic charge 14, an energy focusing guide element or guide 18, and a yield multiplying or reactive material 32.

Illustratively, the energetic charge 14, also referred to as a driver explosive 14 may optionally be loaded in an optional upper housing 12. In the illustrated embodiment, the optional upper housing 12 is shaped as a cylindrical shell having a closed top or proximal end 22 (optionally with a central aperture (not shown)) and an open lower or distal end 24. The housing 12 may optionally contain a thin insulation layer.

The energetic charge or driver explosive 14, in an illustrative embodiment, is a pressable charge, although castable, pourable, or other charges may be used. The energetic charge 14 may include a nitrate-containing compound, and, in particular, an amount of at least about 90 weight percent, and, more particularly, at least about 94 weight percent of the total weight of the charge 14. The nitrate-containing compound may include one, two, three, or more nitrate groups (and, in particular, tri-nitro or higher), and may be selected, for example and without limitation, from one or more of the following: a nitramine, such as 1,3,5-trinitro-1,3,5-triaza-cyclohexane (RDX), 1,3,5,7-tetranitro-1,3,5,7-tetraaza-cyclooctane (HMX), and 2,4,6,8,10,12-hexanitro-2,4,6,8,10,12-hexaazatetracyclo-[5.5.0.0.sup.5,90- .sup.3,11]-dodecane (CL-20); a nitrate ester, such as, pentaerythritol tetranitrate (PETN), ethylene glycol dinitrate (EGDN), nitroglycerin (NG); and/or other nitrates, such as, trinitrotoluene (TNT), 1,3,5-triamino-2,4,6-trinitrobenzene (TATB), 1,1-diamino-2,2-dinitro ethane (DADNE), and 3-nitro-1,2,4-triazol-5-one (NTO); and others, such as 1,3,3-trinitroazetidine (TNAZ); and combinations.

The energetic charge 14 optionally may include additional ingredients, such as for example and without limitation, oxidizers, binders, curing agents, plasticizers, and less desirably, small amounts of metal (e.g., aluminum) and carbon fuel. Examples of oxidizers include nitrates and perchlorates, such as, ammonium perchlorate. Non-energetic binders, energetic binders, or a combination thereof may be used. The binder may be plasticized or unplasticized and may be selected from substituted or unsubstituted oxetane polymers, polyethers, and polycaprolactones. Representative binders that may be selected include, among others, hydroxy-terminated polybutadiene (HTPB), polypropylene glycol, polyethylene glycol, poly (glycidyl nitrate) (PGN), poly(nitratomethylmethyl-oxetane) ("poly-NMMO"), glycidyl azide polymer ("GAP"), diethyleneglycol triethyleneglycol nitraminodiacetic acid terpolymer ("9DT-NIDA"), poly (bisazidomethyl-oxetane) ("poly-BAMO"), poly-azidomethyl-methyloxetane ("poly-AMMO"), nitrocellose, polybutadieneacrylonitrile acrylic acid terpolymer ("PBAN"), and combinations and copolymers thereof. The binder formulations will generally include a curative appropriate for the binder. For example, a polyisocyanate curing agent is often used with polyglycidyl nitrate, polyoxetanes, polyglycidyl azide, hydroxy-terminated polybutadienes, and polyethers, whereas an epoxy curing agent is generally used with other binders, such as, PBAN.

In one illustrative embodiment a detonator or initiator 16 extends into an upper end of the upper housing 12 and illustratively 16 resides in an annular housing 17. A portion of the illustrative initiator 16 is substantially adjacent to the energetic charge 14. Exemplary initiators 16 include, for example and without limitation, standard fuse cords, blasting caps (e.g. RP80), electric matches with lead lines, and other known and/or suitable initiators and detonators. The initiator 16 illustratively is capable of a remote activation to place the operator a safe distance from the explosive event of initiating or detonating the energetic charge 14. The annular housing 17 illustratively may be made of various materials, including metallic, non-metallic, and composite materials. Acrylics comprise one exemplary suitable material.

The illustrative energy-focusing guide 18, also referred to as a shock guide and a guide element, is operatively associated with, joined or connected to the energetic charge 14 for example and without limitation by being connected or operatively associated with the upper housing 12. The energy-focusing guide 18 includes an internal passageway 20, which extends through the energy-focusing guide 18. In particular, in FIG. 1, the upper housing 12, including the energetic charge 14, is intermediate the initiator 16 and the proximal end 22 of the energy-focusing guide 18. The cross-sectional dimension of the internal passageway 20, illustratively, may decrease (FIG. 1) or may remain constant (FIG. 2) from the proximal (top in FIG. 1) end 22 to the distal (bottom in FIG. 1) end 24 of the energy-focusing guide 18. In the illustrative embodiment shown in FIG. 1, the internal passageway 20 and an exterior surface 21 of the energy-focusing guide 18 illustratively tapers at a substantially constant rate from the proximal end 22 proceeding to the distal end 24. The proximal end 22 is substantially adjacent to the energetic charge 14. In the device 10A shown in FIG. 2, the internal passageway 20A and an external surface 23 of the energy-focusing guide 18A remain substantially constant in dimension between the proximal end 22A and the distal end 24A. The proximal end 22A is substantially adjacent to the energetic charge 14. It should be understood that other cross-sectional profiles are possible, such as those comprising tapering and non-tapering portions, that is, cross-sectional dimensions of the internal passageway 20/20A may include decreasing portions and constant portions. In another embodiment, the internal passageway 20/20A, may taper at a non-constant rate proceeding from the proximal end 22/22A to the distal end 24/24A. It will further be appreciated that the internal passageway 20/20A and the exterior surface 21/23 may have cross sections that differ from one another. For example and without limitation, the external surface could have a substantially cylindrical cross section 23 as shown in FIG. 2, that remains substantially constant in dimension between the proximal end 22/22A and distal end 24/24A, while the internal passageway 20 tapers at a constant or non-constant rate proceeding from the proximal end 22/22A to the distal end 24/24A, and vice versa. In order to produce shock velocity sufficient to enhance yield as described herein, it is desirable that no region of the internal passageway 20/20A increases in cross-sectional dimension proceeding from the proximal end 22/22A to the distal end 24/24A.

Figure 2:
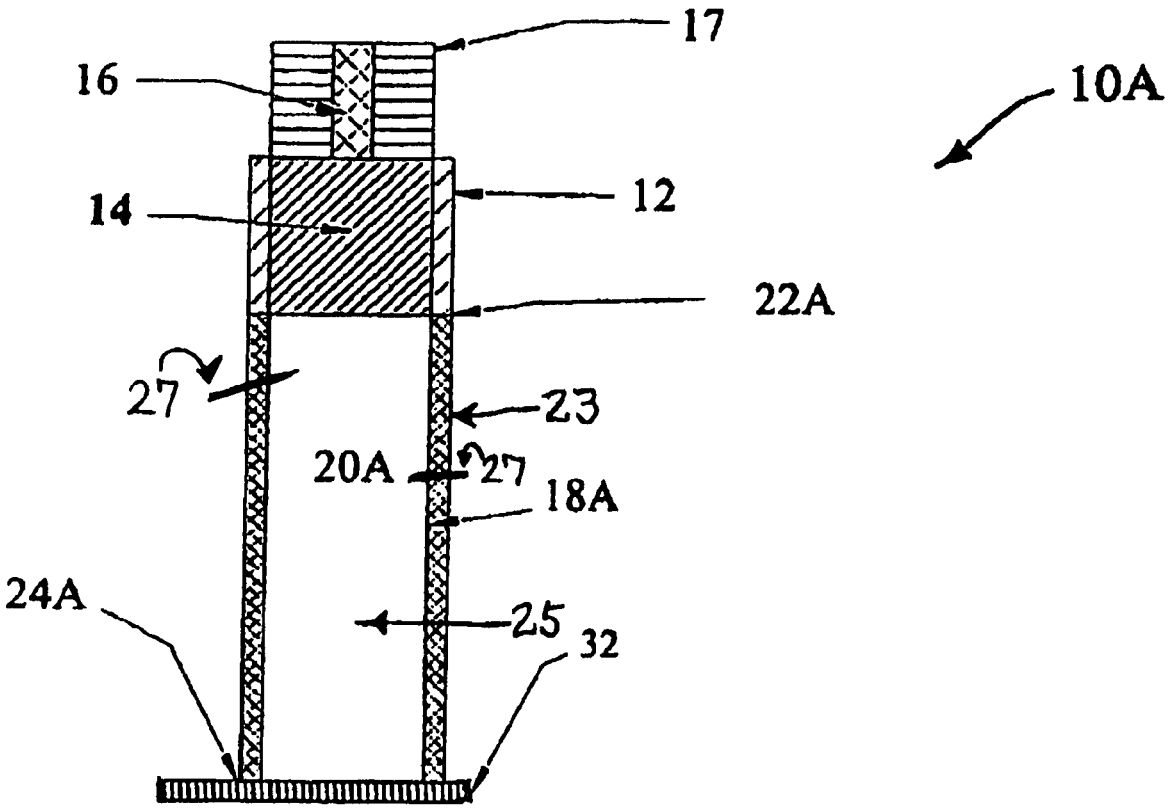
FIG. 2 is a side, cross-sectional view of another illustrative embodiment of a yield enhancing device.

Referring to FIGS. 1 and 2, the upper housing 12 and the energy-focusing guide 18/18A may be made of the same or different materials, including, for example, metals, alloys, plastics, composites, paper and pulp products, etc. Illustratively, the materials selected may generally be compatible with the intended use environment (e.g., high or low temperature, maritime, under water etc.) of the device 10.

The internal passageway 20/20A includes and generally is filled with fluid, for example, an ionizable gas 25, which is a compressible, ionizable gas. Examples of suitable ionizable gases 25, include, but are not limited to, air, hydrogen, helium, argon, oxygen, and nitrogen, and combinations thereof. The gas 25 is generally maintained at atmospheric pressure, that is, about 1 ATM.

Illustratively, the yield multiplying/reactive material 32 will be chosen such that it is generally inert, but energetically reactive when impacted by sufficient energy. Suitable reactive materials include for example and without limitation, alone or in combination with other materials, rubber, polyethylene, polytetrafluoroethylene (e.g., TEFLON), and certain metals.

In operation, upon activation of the igniter 16, the energetic charge 14 in the upper housing 12 is detonated, generating or releasing a shockwave. Without wishing to be bound necessarily by any theory, one contends that the shockwave passes through gas contained in the energy-focusing guide 18 to compress, heat, and accelerate the gas 25 in the direction of the shockwave front motion. The shockwave has an initial "detonation velocity." Detonation velocity is measured for the purposes of this invention in accordance with the technique set forth in John M. McAfee, Blaine W. Asay, A. Wayne Campbell, John B. Ramsay, Proceedings Ninth Symposium on Detonation, OCNR 113291-7 pp. 265-278 (1989). Examples of detonation velocities for many compositions are set forth in Navy Explosive Handbook: Explosive Effects and Properties Part III, 1998. The shockwave proceeds generally away from the driver explosive or energetic charge 14 and into the guide 18, which guides and focuses the shockwave on to the reactive material 32. The shockwave creates a rapid pressure and heat insult which interacts with the reactive material 32 in order to urge the reactive material to begin its process to release energy adding to the total energy release from the driver explosive or charge 14.

As the shockwave passes through the guide 18/18A and encounters the gas 25, the shockwave may slow somewhat. If the shockwave passing through the guide 18/18A has an effective velocity to excite gas molecules into a reactive transition state, the gas 25 begins to undergo exothermic decomposition and enters into a plasma state. The velocity needed to generate plasma will depend primarily upon the ionization potential of the gas 25 contained in the energy focusing guide 18/18A. Gas ionization potentials are reported in the CRC Handbook of Chemistry and Physics. For example, in the case of air, the detonation velocity is generally at least about 7 mm/μsec (millimeters per microsecond) and the effective velocity of the shockwave is generally about 6 mm/μsec at a temperature of at least about 10,000° C., and more particularly, at least about 20,000° C. to about 50,000° C., and even more particularly, at least about 50,000° C., where higher velocities are produced respectively. Other gases may have higher or slower ionization potential and require different effective velocities. Accordingly, in other embodiments, the detonation velocity may equal the effective velocity, alternatively the detonation velocity may be greater than the effective velocity or possibly, the detonation velocity may be equal to or less than the effective velocity.

Advantageously, the construction of the device 10, 10A requires small amounts of energetic charges to achieve the desired enhancement. For example, according to one experimental test, detonating about 160 grams of explosive 14 and focusing the resultant shockwave and explosive products through a substantially constantly tapering guide 18 of about six inches in length, into impact with a piece of rubber material 32 about one inch thick, resulted in a shockwave consonant with the above results and resulted in the creation of a larger hole in a steel plate placed on the other side of the rubber material than was created in the steel plate without using the rubber material 32. Thus, for example and without limitation, the same amount of explosive could be used to produce a higher yield explosion. So, too, a lesser amount of explosive could be used to create the same yield thereby allowing for safer ordnance. Similarly, ordnance with less energetic material could be used to create a similar energy release in a safer and less sensitive warhead. It will also be appreciated that the reactive material could be integrated directly into the formulation of the explosive, could be integrated into a projectile that would actually hit a target, or could be integrated into the liners of shaped charges to likewise increase the yield and/or safety of various ordnance.

The velocity of the shockwave as it passes through the gas 25 may be measured as follows. Fiber optic cables 26/27 with a core diameter of 250 μm are passed perpendicular to the length of the guide 18/18A through both walls of the guide 18/18A. One end of the fiber is connected to a laser and the other end is connected to a silicon photodiode. The fiber that is inside the guide 18/18A has the low-index cladding removed, resulting in a fiber that is exposed to the atmosphere in the guide. Since the index-of-refraction of the atmosphere in the guide, initially air at ambient pressure, is considerably lower than the index-of-refraction of the fused silica core of the fiber, almost all of the laser light coupled to the fiber will remain in the fiber as is passes through the guide. However, when the higher-pressure shock wave passes by the fiber, the index-of-refraction of the air increases to the point that light begins to escape the fiber. This arrangement results in a measurable decrease in detected laser light as the shockwave passes the fiber optic. By placing a series of fiber optics at known locations along the length of the guide, the shock velocity in the guide may be calculated by dividing distance the fiber is from the energetic by the arrival time of the shock at the fiber.

Without wishing to be bound by any theory, one contends that the energy-focusing device 18/18A is primarily responsible for increasing the efficiency of ionization and polarization of the gas 25 so that smaller amounts of energetic charge are required. As the shock waves and hot explosive gases from the energetic material 14 are propagated down the interior passageway 20/20A of the shock guide 18/18A, the gas 25 is compressed and the energy is applied to a smaller volume of gas. The compressed gas 25 undergoes greater local heating and ultimately decomposes to atoms and then the atoms become ionized into positively charged atoms and negatively charged free electrons within the shock guide 18/18A to a greater degree. Additionally, the guide 18/18A confines the charges and plasma allowing time for the charge separation to occur without them dissipating to the ambient atmosphere on the outside of the guide 18/18A. The configuration of the energy-focusing guide 18 efficiently captures and channels energy of the plasma on the reactive material 32, which, without wishing to be bound by any theory, it is believed, causes the deflagration of the reactive material 32. Deflagration is a very fast burning mechanism where the burn rate increases as a function of time. This deflagration turns the reactive material into a gas thereby releasing the energy contained therein, which released energy is combined with that of the energetic charge 14 to increase yield.

In addition to having yield enhancing device 10 include an integral reactive material 32, such a device could be operatively formed by placing the distal end 24/24A of the device 10/10A in contact with or immediately adjacent to reactive material 32 external to, or apart from the device 10A.

The yield enhancing device 10, 10A may be manufactured in any appropriate manner. One such illustrative method for manufacturing the device 10, 10A includes inserting the initiator 16 through an aperture in the closed end of the housing 12. Adhesives, mechanical fasteners, tape, or the like may be used to retain the initiator 16 in place. The housing 17 illustratively is coupled generally with a hermetic seal, to the energy-focusing guide 18/18A using adhesive (e.g., epoxy), mechanical fasteners, or the like. The order for inserting the initiator 16, loading the charge 14, and coupling the energy-focusing guide 18/18A is not particularly important, and may be practiced in any sequence.

The neutralizing device and method of the present invention have a wide range of utilities. Additional advantages and modifications will readily occur to those skilled in the art upon reference to this disclosure. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents. Any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A yield enhancing device, comprising:

an energetic charge, a guide, and a reactive material, wherein the energetic charge and the guide are operatively joined to each other, and wherein the guide and the reactive material are adjacent to each other at a distal end of the yield enhancing device.

2. The device of claim 1, further comprising a housing including the energetic charge, wherein said housing and said energetic charge are operatively joined to the guide, and wherein the guide and the reactive material are operatively joined to each other.

3. The device of claim 2, wherein the reactive material is generally inert.

4. The device of claim 2, wherein the reactive material reacts energetically.

5. The device of claim 2, wherein the reactive material comprises polytetrafluoroethylene.

6. The device of claim 2, wherein the reactive material comprises polyethylene.

7. The device of claim 2, wherein the reactive material reacts energetically, and wherein the reactive material comprises rubber.

8. The device of claim 2, wherein the reactive material reacts energetically, and wherein the reactive material comprises a metal.

9. The device of claim 2, wherein the reactive material reacts energetically, and wherein the guide tapers from the energetic charge to the reactive material.

10. A yield enhancing device, comprising:

an energetic charge, a guide, and a reactive material, wherein the guide is sandwiched between and operatively associated with each of a driver explosive and the reactive material, which is located at a distal end of the yield enhancing device, and wherein the guide generally tapers from the energetic charge to the reactive material, the reactive material is generally inert but energetically reactive.

11. The device of claim 10, wherein the reactive material comprises polytetrafluoroethylene.

12. The device of claim 10, wherein the reactive material comprises polyethylene.

13. The device of claim 10, wherein the reactive material comprises a metal.

14. A method of enhancing yield, comprising:

producing a shock wave, imparting the shockwave at an effective velocity and temperature on a fluid to create and drive a plasma, and impacting the plasma on a reactive material to release energy stored in the reactive material, which is located at a distal end of the yield enhancing device.

15. The method of claim 14, further comprising activating an energetic charge for producing the shock wave.

16. The method of claim 15, wherein the reactive material comprises a generally inert but energetically reactive material.

17. The method of claim 15, wherein the reactive material comprises polytetrafluoroethylene.

18. The method of claim 15, wherein the reactive material comprises polyethylene.

19. The method of claim 15, wherein said impacting comprises the plasma is focused on the reactive material with a guide element.

20. A method of manufacturing a yield enhancing device, comprising:

positioning an energetic charge in operative association with one end of a guide element; and positioning another end of the guide element in operative association with a reactive material, which is located at a distal end of the yield enhancing device.

21. The method of claim 20, wherein the reactive material comprises a generally inert but energetically reactive material selected from one of polytetrafluoroethylene, polyethylene, rubber, and a metal.

* * * * *